Nov. 13, 1956

G. W. HOPKINS 2,770,416

CALCULATING MACHINE

Filed April 13, 1951

INVENTOR
GEORGE W. HOPKINS

BY Robyn Wilcox

ATTORNEY

Nov. 13, 1956  G. W. HOPKINS  2,770,416
CALCULATING MACHINE

Filed April 13, 1951  7 Sheets-Sheet 2

FIG_3

FIG_2

INVENTOR.
GEORGE W. HOPKINS
BY Robyn Wilcox
ATTORNEY

Nov. 13, 1956　　　G. W. HOPKINS　　　2,770,416
CALCULATING MACHINE

Filed April 13, 1951　　　　　　　　　　　　　　　7 Sheets-Sheet 3

INVENTOR.
GEORGE W. HOPKINS
BY
ATTORNEY

Nov. 13, 1956 G. W. HOPKINS 2,770,416
CALCULATING MACHINE
Filed April 13, 1951 7 Sheets-Sheet 7

FIG_9

FIG_10

INVENTOR
GEORGE W. HOPKINS
BY Robyn Wilcox
ATTORNEY

United States Patent Office 2,770,416
Patented Nov. 13, 1956

2,770,416

CALCULATING MACHINE

George W. Hopkins, San Leandro, Calif., assignor to Friden Calculating Machine Co., Inc., a corporation of California Application April 13, 1951, Serial No. 220,809

11 Claims. (Cl. 235—61)

This invention relates to electrically controlled calculating machines, and more particularly to improved means for electromechanically controlling operation of the accumulator thereof.

It is an important object of the invention to provide a calculating machine in which most of the operations are performed by electrical means.

Another object of the invention is to provide improved electromechanical means for transmitting both digitation and transfer pulses to the accumulator dials of a computing machine.

It is also an object of the invention to provide an ordinally arranged magnetic drive for an electromechanical accumulator which is readily adaptable to cause registration therein.

It is still another object of the invention to produce an electromechanical accumulator having a plurality of numeral wheels controlled by a magnetic clutch and escapement mechanism in each order, the step by step escapement action of each such ordinal clutch being determined by a single pulse responsive means in that order which is responsive to both digitation and tens-transfer control impulses.

These, and other, objects of the invention will be apparent from the specification and claims which follow, and will readily be understood from a consideration of the specification and drawings referred to therein. In such drawings:

Figure 1:
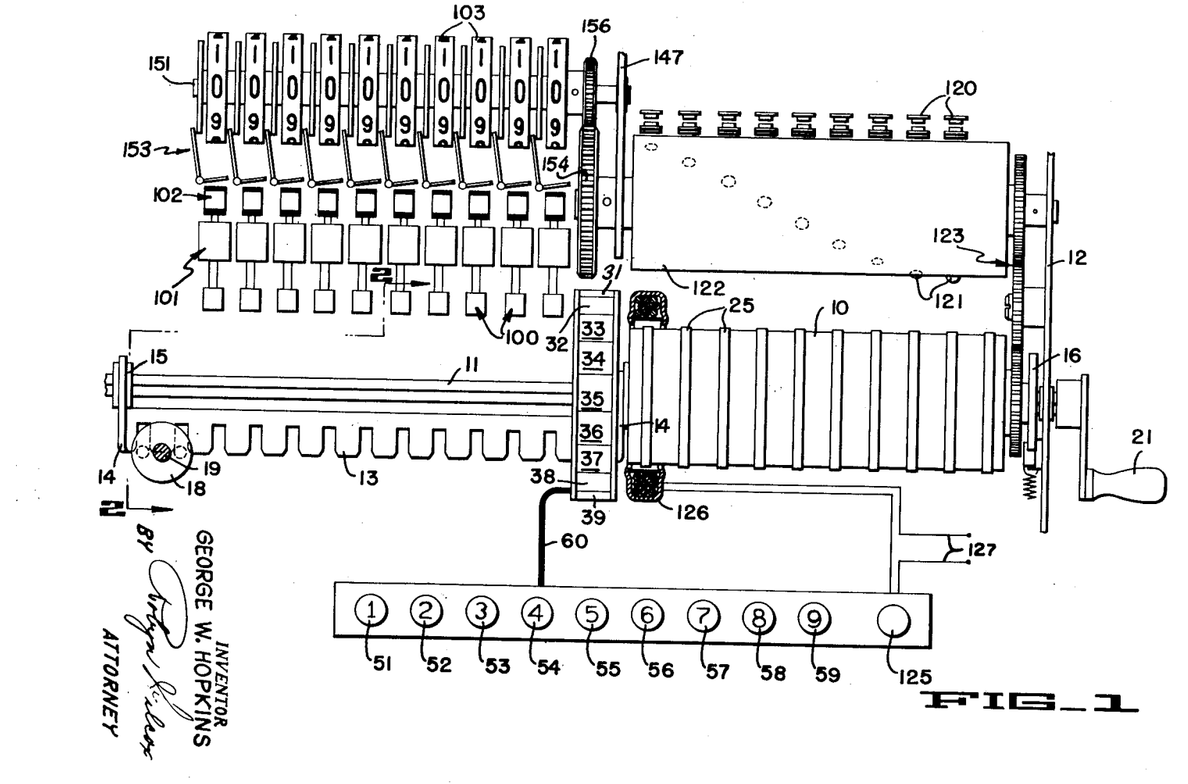
Fig. 1 is a diagrammatic arrangement of the machine.
Figure 2:
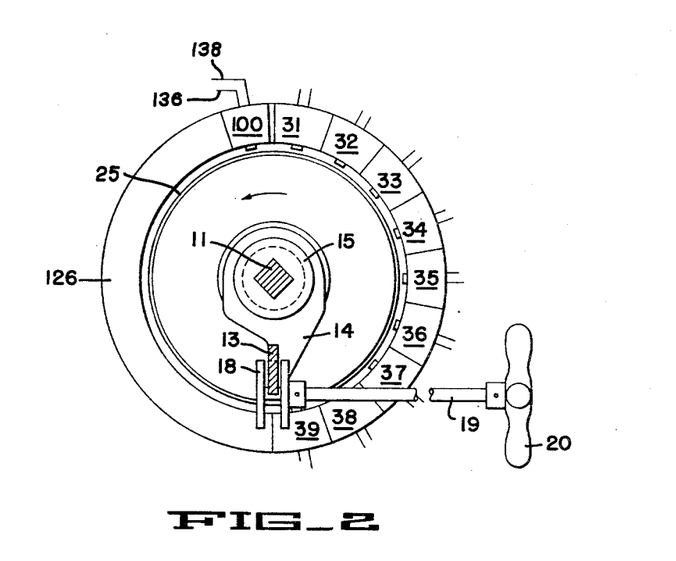
Fig. 2 is a sectional view taken along the line 2—2 in Fig. 1 and looking in the direction of the arrows.

Referring first to Fig. 1 of the drawings, there is shown a calculating machine of the type shown and described in my copending application S. N. 676,677 filed June 14, 1946, Patent No. 2,608,346 issued August 26, 1952, which machine includes a drum 10 mounted on a square shaft 11 suitably supported on a framework, part of which is indicated at 12. The drum 10 is slidable on the square shaft 11 and rotatable therewith. In order to slide the drum 10 along the shaft 11, a rack 13 is provided which has hangers 14 engaging grooved collars 15 (Fig. 2). A pin wheel 18 on a shaft 19 having a handle 20 engages the rack 13 and when rotated serves to move the rack and the drum along the shaft 11. Crank 21 secured to the end of the shaft 11 is utilized to rotate the drum 10. This rotation, however, is not imparted to the rack 13. The shaft 11 has secured thereto a cam 16 (Figs. 1 and 7) which coacts with a leaf spring follower 17 that controls a full cycle switch 114 and serves as a centralizer to determine full cycle position of the shaft 11.

The drum 10 has secured thereto a plurality of tapes or wires 25 which are of suitable material for magnetic recording. While I have referred to the magnetic record material as being in the form of a tape or wire, I wish it to be understood that this portion of the mechanism may take any convenient form such as, for example, a disk or cylinder as will presently be apparent. The result desired is that there be distributed over an area of the drum, disk, or cylinder a series of index points which may be made magnetically discernible, and that these points may be placed in columns with the points in each column having digital value according to their place in the column, and that the columns be spaced so that each column's position is indicative of decimal value. In the embodiment shown, the body of the drum 10 is preferably of non-magnetic material. As shown in Fig. 1, the parts are in the original or full cycle position prior to the set up of a value in the drum, and this is accomplished as will now be described.

Figure 3:
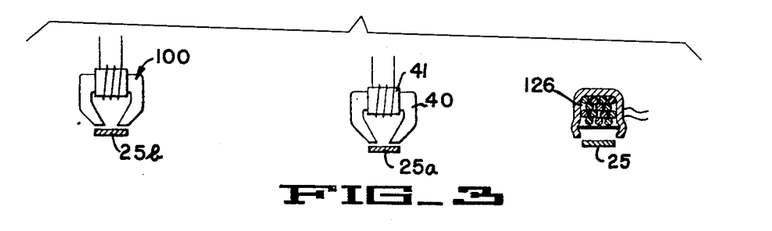
Fig. 3 is a diagrammatic showing of certain elements of the machine.
Figure 4:
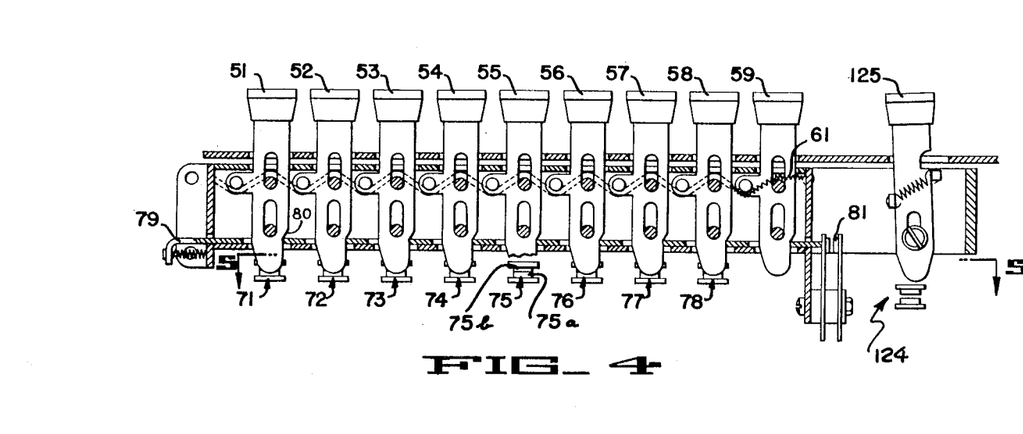
Fig. 4 is a view of the keyboard.
Figure 5:
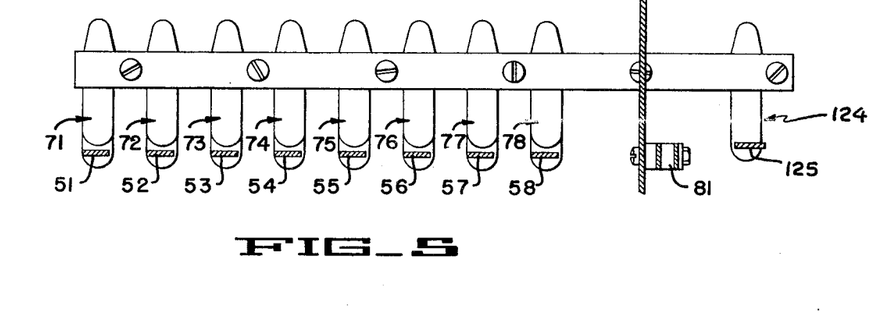
Fig. 5 is a sectional view taken along the line 5—5 in Fig. 4.

A series of nine electromagnets 31-39 (Figs. 1 and 2) are arranged in an arc concentric with the shaft 11 and drum 10. One of these electromagnets is shown in detail in Fig. 3, where it will be seen that it comprises a pole piece 40 having a winding 41. The construction of the electromagnets 31-39 is substantially identical. Energization of the electromagnets 31-39 is controlled by nine keys 51-59 and the wires leading from the keyboard to the electromagnets are shown as being enclosed in a conduit and indicated at 60 (Fig. 1). Referring to Figs. 4 and 5 the keys 51-59 are suitably mounted for vertical sliding movement and are normally urged upwardly by a spring 61. Keys 51-58 have associated therewith normally closed switches 71-78. Switch 75 is shown as comprising blades equipped respectively with normally engaged contact points 75a and 75b. Switches 71 to 74, and 76 to 78 are similar to switch 75. Depression of a selected one of the keys 51-58 will open its corresponding switch. The stems of the keys pass through slots in a slide 79 which is spring-urged to the left (Fig. 4). The key stems are similar in configuration and each have a cam face 80 which, upon depression of the selected key, moves the slide 79 to the right (Fig. 4). This movement of the slide causes closure of a switch 81.

Figure 6:
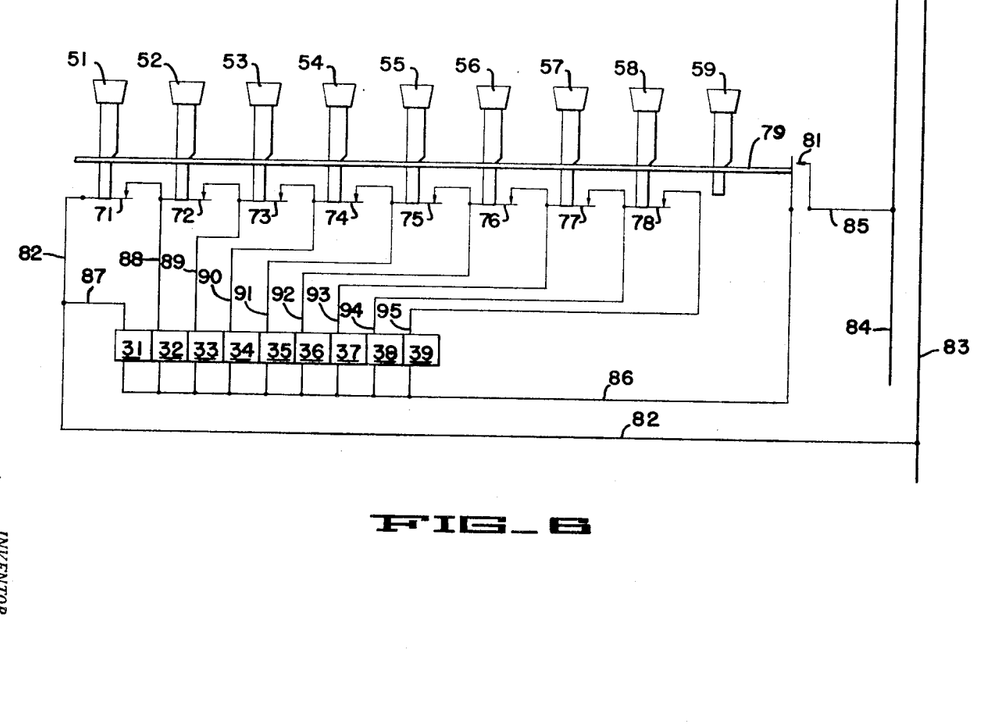
Fig. 6 is a wiring diagram showing the circuits controlled by the keys on the keyboard.

Referring to Fig. 6, the electrical connections of the elements just described will now be explained. The switches 71-78 are connected in series, and the switch 71 is connected by a line 82 to one side 83 of a direct current power supply. The other side 84 of the power supply is connected by a line 85 to one side of the switch 81, the other side of which is connected to a line 86 common to the nine electromagnets 31-39. A line 87 connects the electromagnet 31 to the line 82. A line 88 connects the electromagnet 32 to the switch 71. A line 89 connects the electromagnet 33 to the switch 72. A line 90 connects the electromagnet 34 to the switch 73. A line 91 connects the electromagnet 35 to the switch 74. A line 92 connects the electromagnet 36 to the switch 75. A line 93 connects the electromagnet 37 to the switch 76. A line 94 connects the electromagnet 38 to the switch 77. A line 95 connects the electromagnet 39 to the switch 78.

Depression of a selected key will cause energization of a number of the electromagnets corresponding to the number of the depressed key. For example, depression of key 51 will open the switch 71 and close the switch 81. This will energize the electromagnet 31 by establishing a circuit from the power supply line 83 through the line 82, the line 87, to the electromagnet 31 and then back through the line 86, the switch 81, and the line 85 to the other side of a power supply 84. None of the other electromagnets 32–39 inclusive will be energized because of the opening of the switch 71. Depression of the key 52 will open the switch 72 and close switch 81. This will establish a circuit from one side of the power supply 83 through the line 82 and the line 87 to the electromagnet 31 and also through the switch 71 and line 88 to the electromagnet 32. The other sides of the electromagnets 31 and 32 are connected to the line 86 which is connected through the switch 81 and the line 85 to the other side of the power supply 84. In like manner, depression of the key 59 causes closure of the switch 81 and, as will be evident, energization of all nine magnets 31–39 results. Thus, it will be seen that depression of any selected numeral key results in energization of a number of electromagnets corresponding to the number of the depressed key.

In order to set up a number on the member 10 (Fig. 1), the operator rotates the pin wheel 18 to shift the drum to the left in order to bring the first magnetic tape 25 into alignment with the poles of the bank of electromagnets 31–39. This position is indicated in Fig. 3 as 25a. The operator then depresses a selected numeral key, for example, the number "4" key, and this causes energization of four electromagnets 31–34 (Figs. 2 and 6). Each of these four electromagnets magnetizes a portion of the tape 25 so that as a result four points on the tape 25 will be magnetized. Upon release of the numeral key the switch 81 opens and the electromagnets are de-energized, but the four points on the tape remain magnetized. The operator now shifts the drum 10 one place to the left in order to set up the next figure and proceeds in the manner just described, and if, for example, he depresses the "6" key the second magnetic recording tape 25 will have six points on it magnetized. In this manner the operator proceeds to set a factor in the drum 10.

After the last digit of the factor has been set in the drum 10, the pin wheel 18 is given one more rotation in order to dispose the tape, in which the last digit or units value has been set, in alignment with the units order pickup coil 100 of the accumulator, it being understood that the other figures are ordinally disposed with respect to the accumulator.

In accordance with the instant invention, the accumulator dial shaft 151 is adapted to be rotated with the drum 10 by turning the crank 21. The driving torque for such rotation is transmitted to the accumulator dial shaft 151 through the gear train 123, the transfer pulse control drum 122, and the gears 154 and 156 (Fig. 1). As the driven dial shaft 151 and each of the magnetic clutches 160 secured thereto is thus rotated, the pulse responsive escapement mechanism becomes operative to restrain or permit unit by unit rotation of the dials 103.

As shown in Figs. 1, 2, 3, and 8, each order of the accumulator includes a pickup, or scanning, coil 100, the terminals of which are connected to the input leads 136, 138 of a suitable electronic amplifier 101. The output leads 140, 181 of amplifier 101 are connected to the actuating coil of a single electromagnet 102 (Figs. 1, 7, and 9) which controls the coacting escapement mechanism 153 in that order. As shown in Fig. 3, each pickup coil 100 is constructed in substantially the same manner as the electromagnets 31–39 and comprises a pole piece and coil corresponding with the pole pieces 40 and coils 41 thereof. The location of the magnetic recording tape with relation to its coacting pickup coil 100 being indicated at 25b in Fig. 3.

In order to enter the value of the magnetic tapes into the accumulator wheels 103 (Fig. 1), the operator rotates a crank 21 in a predetermined direction. As each magnetized point on the tapes 25 passes the poles of its associated pickup coil 100, current is induced therein. If the number set up is "46," for example, and the crank is rotated one revolution, the pickup coil 100 in the units order of the accumulator will have six pulses of current induced in it while that in the tens order will have four pulses induced therein. These pulses are then amplified by a conventional electronic amplifier 101. If the digitation pulse current induced in each such ordinal pickup coil is of sufficient strength, no amplification thereof will be required and the amplifiers 101 may then be dispensed with.

Figure 8:
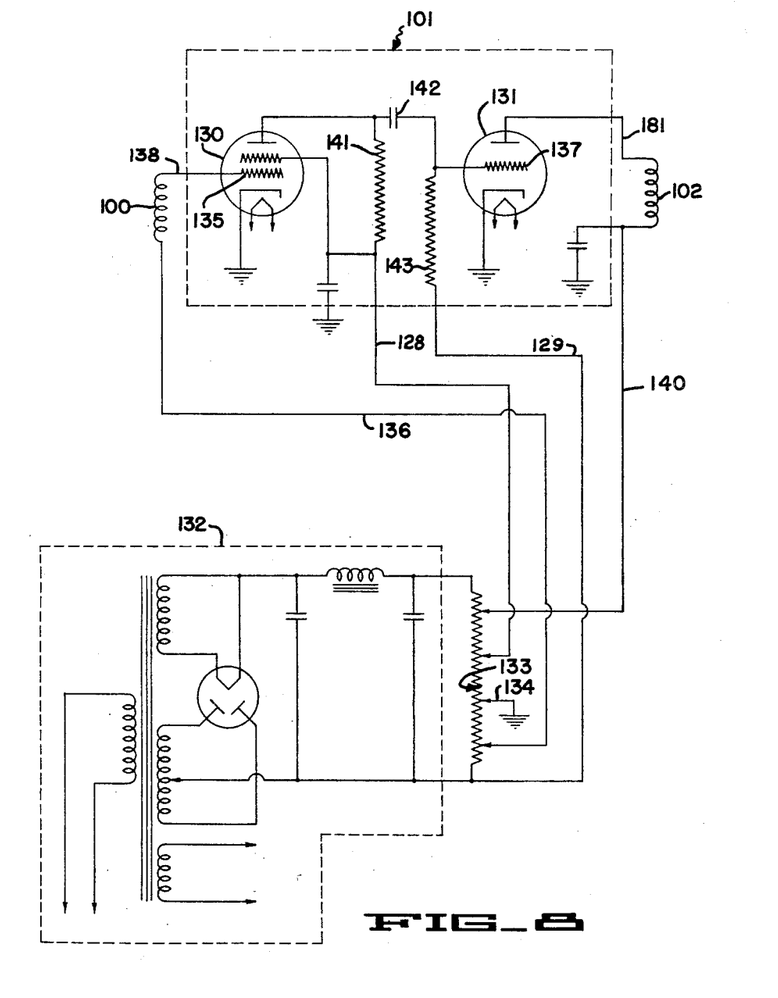
Fig. 8 is a typical wiring diagram of one of the digitation amplifiers.
Figure 9:
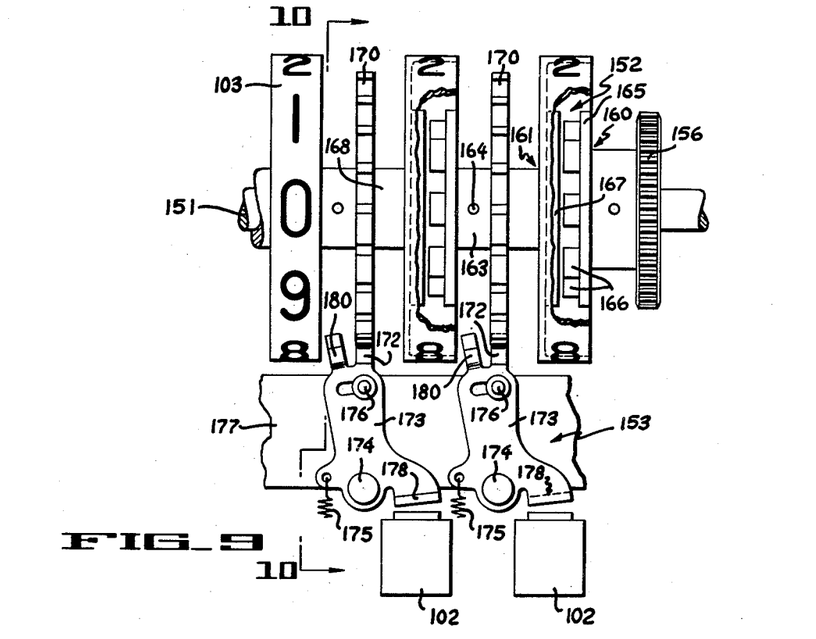
Fig. 9 is an enlarged plan view of the accumulator illustrated in Fig. 1, with certain portions broken away to more clearly show details of the ordinal magnetic clutch.

Referring now to Fig. 8, there is shown an amplifier 101 of conventional design suitable for amplifying the digitation pulses received by the pickup coils 100 and transmitting these pulses to the ordinally arranged electromagnets 102. Each such amplifier includes a vacuum tube 130 of the high gain type which preferably has a sharp cutoff. Connected to the vacuum tube 130 is a power amplifier tube 131. The power supply 132 supplies D. C. voltage to the voltage divider 133. The cathodes of both tubes 130 and 131 are grounded, and the line 134 on the divider 133 is also grounded. The control grid 135 of tube 130 is connected by coil 100 and line 136 to the voltage divider 133 and is biased negatively to the plate current cutoff point. Also, the control grid 137 of tube 131 is negatively biased by being connected to the divider 133 through line 129 and resistor 143. Lines 128 and 140 supply plate voltages to the respective tubes 130, 131. Normally, neither tube 130 nor 131 passes plate current.

When current is induced in the pickup coil 100 in the manner previously described, the negative bias on the grid 135 is reduced and a pulse of plate current flows through tube 130, line 128, and the voltage drop resistor 141. The resulting voltage pulse developed across resistor 141 is applied by means of condenser 142 and resistor 143 to the control grid 137 of tube 131. The negative bias is thereby reduced causing a large pulse of plate current to flow in the tube 131, which current pulse flows through the actuating coil of the clutch escapement control electromagnet 102 associated with that order of the accumulator.

Referring now to Fig. 1, it will be recalled that as the crank 21 is turned, uni-directional rotation is imparted to the tens-transfer pulse control drum 122 through the gear train 123. On the tens-transfer control drum 122 are protuberances 121 disposed in staggered relationship circumferentially of the drum, one such protuberance for each order of the accumulator except the units order. The rightmost protuberance 121 (Fig. 1) for the tens-order is the first become effective, immediately following the digitation phase of the cycle, to initiate the transfer of "1" to that order in the accumulator. Thereafter the protuberances 121 close the normally open switches 120 one after the other, beginning in the tens order and proceeding progressively to the higher orders.

The ordinal magnetic clutch mechanism associated with each accumulator wheel 103 will now be described. In each order of the accumulator there is provided a magnetic clutch driving assembly 160 and clutch driven assembly 161 (Fig. 9) which are adapted to coact as an ordinal unit 152. Each such clutch driving assembly 160 includes a hub 163 pinned as at 164 (Fig. 9) to the accumulator dial shaft 151, which hub is provided with a disk 165 which carries a plurality of outwardly protruding and equiangularly spaced permanent magnets 166 composed of Permalloy or other suitable high permeable magnetic material. These permanent magnets 166 extend outwardly into predetermined close proximity to, but do not actually touch, the adjacent surface of a coacting magnetic drag or follower disk 167 which is attached to and disposed within each accumulator dial 103. Each such magnetic drag or follower disk 167 and associated dial 103 is suitably secured to one end of a hub 168 which is rotatably supported on the accumulator dial shaft 151. Secured to the opposite end of hub 168 is a ratchet wheel 170 having teeth thereon suitably spaced to correspond with the numerals on the accumulator dial 103. Thus, each such dial 103, drag disk 167, hub 168, and ratchet wheel 170 form a magnetically driven assembly 161 (Fig. 9) which is carried by and rotatable on the driving shaft 151. Thus the driven assembly 161 is urged by magnetic force to turn in the same direction as the shaft 151. Actual rotation of each such driven assembly 161 and counting dial 103 carried thereby is normally restrained, however, by a holding pawl 172 (Fig. 10) on the electromagnetically controlled escapement lever 173 engaging a tooth on ratchet wheel 170.

Each lever 173 is suitably pivoted as at 174 on the transverse frame bar 177 and is normally urged in a counter-clockwise direction (Fig. 9) by a spring 175 to maintain the holding pawl 172 in the plane of the ratchet wheel 170. The pivotal movement of each such lever 173 being suitably limited by the pin-and-slot connection 176. The other end of each such lever 173 is provided with a flange 178 formed at right angles thereto and composed of soft iron or other suitable magnetic material which is pulse responsive to an electromagnet 102 whenever the actuating coil thereof is energized. The lever 173 has an offset ear 180 which acts as an escapement pawl thus limiting rotation of the driven assembly to a partial step for each rocking of lever 173. Each pulse received by electromagnet rocks the lever 173 clockwise (against the tension of its spring 175) to rock pawl 172 out of blocking engagement with wheel 170 and to move the escapement pawl 180 into engagement with an adjacent tooth on ratchet wheel 170. The construction and cooperative arrangement of the teeth of ratchet wheel 170 and the pawls 172, 180 on the associated escapement lever 173 is such as to cause the ratchet wheel 170 and dial 103 to be advanced one-tenth of a revolution by drive shaft 151, for each pulse received by the magnet 102.

Figure 10:
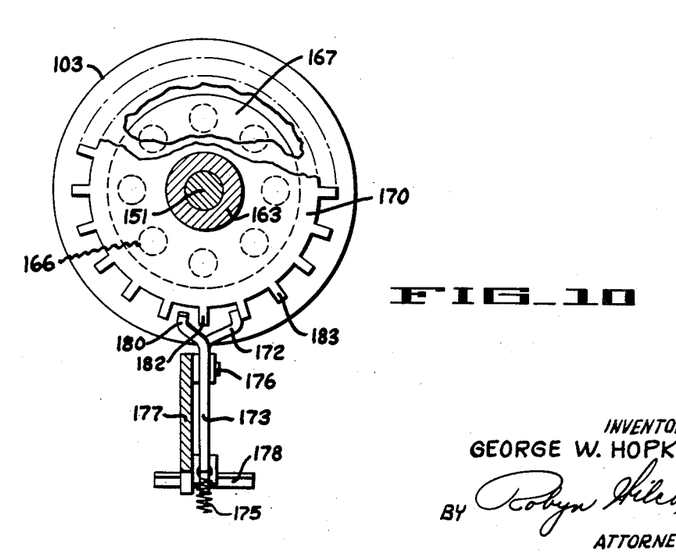
Fig. 10 is a sectional view of the ordinal magnetic clutch and associated escapement mechanism taken along the lines 10—10 in Fig. 9.

Upon rotation of shaft 151 and the clutch driving assembly 160, the permanent magnets 166 transmit torque solely by magnetic action to the drag, or follower, disk 167 on the clutch driven assembly 161. Hence, the accumulator counting wheels 103 are always urged to turn in the same direction as the driven shaft 151. Rotation of the magnetically driven disks 167 and counting wheels 103 is normally blocked, however, by the associated escapement mechanisms 153. Step-by-step rotation of each numeral wheel 103 is controlled by the coacting pulse-responsive escapement mechanism which includes a single electromagnet 102 in the same order. Upon energization of each such electromagnet 102 the escapement lever 173 is rocked clockwise as viewed in Fig. 9 so that pawl 172 is moved out of engagement with a tooth on ratchet wheel 170 and pawl 180 is moved into the plane of the wheel. For a registration in the numeral wheel 103, as seen in Fig. 10, the ratchet wheel 170 is then rotated clockwise one-half step or until the tooth 182 abuts the pawl 180. The electromagnet 102 is then de-energized, the escapement lever 173 is thereby spring-urged to its normal position, and the pawl 172 becomes operative to check the rotation of the ratchet wheel 170 by engaging the tooth 183. Thus, the numeral wheel 103 has been rotated one step to register the next higher figure. After the desired factor has been entered into the dial 103, the corresponding escapement lever 173 restrains the numeral wheel against rotation and causes a slipping disengagement with its associated magnetic driving clutch 160.

Figure 7:
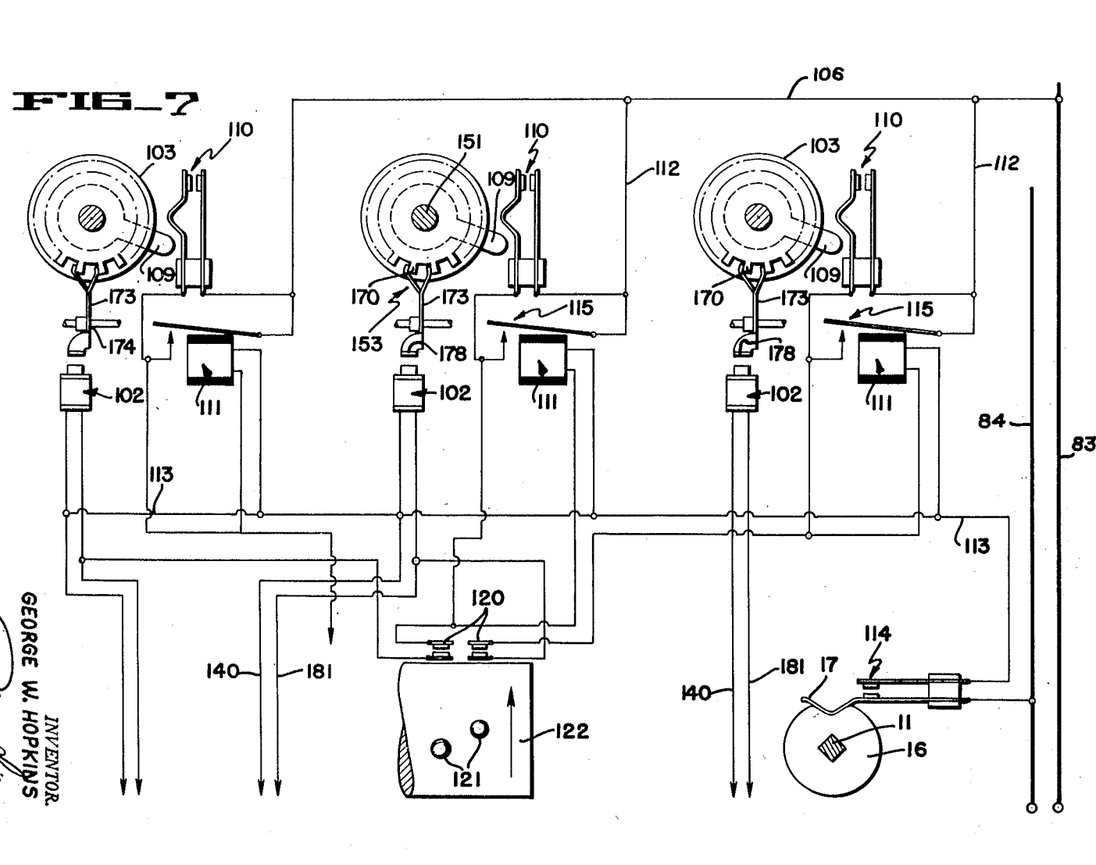
Fig. 7 shows the circuit arrangement for the escapement mechanism associated with each ordinal magnetic clutch, and also the transfer circuit of the calculating machine.

As shown in Figs. 1, 7 and 8, digitation pulses induced in the respective ordinal pickup coils 100 are adapted to be supplied to the input leads 136, 138 of an associated electronic amplifier 101. The output leads 140, 181 are connected to the actuating coil of the electromagnet 102 which controls the step-by-step angular rotation of the numeral wheel 103 in that order. The units order electromagnet 102 (shown on the right in Fig. 7) is responsive only to digitation impulses supplied thereto through the first order amplifier output leads 140, 181, whereas each electromagnet 102 for the tens and higher orders of the accumulator not only responds to digitation pulses but also responds to control pulses which are adapted to effect a transfer, or carry, of "1" from one order of the accumulator to the next high order thereof.

The mechanism for supplying such transfer pulses is best illustrated in Fig. 7, wherein three consecutive orders of the accumulator are shown. In this figure the rightmost order represents unit values, the middle order represents tens values, and the leftmost order represents hundreds values. Each accumulator wheel 103 is provided with a tooth 109 (Fig. 7) which, when the numeral wheel passes from "9" to "0," through its carry position, closes a normally open transfer conditioning switch 110. Upon initiation of the digitating cycle the square shaft 11 (Figs. 1 and 7) is rotated and the centralizer cam 16, secured thereto, closes the control switch 114. Each switch 110 then becomes operative to control the closure of a coacting pair of normally open contacts 115 by energizing the actuating, or holding, coil of an associated self-locking relay 111. One side of each switch 110 is connected by a line 112 and common conductor 106 to one side 83 of the power supply. The other side of the switch 110 is connected to the actuating coil of the relay 111 in that order. The coils of all relays 111 are also connected by a common line 113 to one side of the normally open switch 114, the other side of which is connected to the power supply line 84. Switch 114 is spring-urged to the open circuit position as long as cam 16 is in the full-cycle position shown in Fig. 7. Accordingly, if in the course of a revolution of the accumulator dial shaft 151, the units order wheel 103 passes from "9" to "0," the corresponding switch 110 will be momentarily closed, thereby closing the contacts 115 and causing the associated self-locking relay 111 to remain closed to store the carry pulse until the switch 114 is subsequently opened by the return of cam 16 to its full-cycle position.

The relay holding, or locking, circuit includes the closed switch 114, the conductor 113, the coil of relay 111, the closed switch 115, and the conductors 112, 106. Whenever each relay 11 is thus energized so as to hold the contacts 115 thereof in their closed position, a connection is established from one power line 83 through the conductors 106, 112 and closed relay contacts 115 to one side of a normally open transfer control switch 120 associated with the tens-transfer drum control 122. Following completion of digitation in the accumulator, in the manner previously described, the tens order transfer control switch 120 (shown furthermost to the right in Fig. 7) is closed by the coacting protuberance 121 on the right end of control drum 122 so as to complete the transfer circuit and momentarily energize the electromagnet 102 which controls the operation of the tens order escapement mechanism. Likewise, as the numeral wheel 103 in the tens order passes from "9" to "0" the tooth 109 thereon momentarily closes switch 110 in that order and energizes the associated relay 111. Upon further rotation of the tens-transfer control drum 122, the protuberance 121 for the hundredths order becomes effective to close the switch 120 in that order. Thus the circuit is completed to energize the electromagnet 102 in the hundredths order and effect the entry of the value of "1" therein. In a similar manner, the single transfer pulse thus supplied from any lower order to the escapement control electromagnet 102 for the next higher order causes a tens-transfer to be effected therein.

After the value set in the digitation member 10 has been entered into the accumulator and the transfer has been effected, the operator releases the crank 21 in the full-cycle position to break the contacts 114 and thereby open the control circuit. He then depresses a key 125 which closes a switch 124 (Fig. 4) and connects a doughnut coil 126 to a suitable source of alternating current, indicated at 127 in Fig. 1. The coil 126 is disposed as shown in Fig. 1, concentric with the axis of the drum 10. The operator now rotates the pin wheel 18 to return the drum 10 to the position shown in Fig. 1, and as each magnetized tape 25 passes through the field of the A. C. coil 126 (Figs. 1 and 3) its magnetization is wiped out. The operator then releases the key 125 and the machine is ready to have the next value set into it in the manner previously described.

It will be evident that in the manner described above items set up on the keyboard can be entered into the register dials 103 where they may be accumulated. It will also be apparent that multiplication could be performed with this machine by setting the multiplicand on the tapes or wires 25 of the drum 10, which drum is then shifted to the left (Fig. 1) to align the units digit of the multiplicand with the units order numeral wheel 103. The crank 21 is then rotated a number of times corresponding to the units figure of the multiplier and the drum 10 is shifted one order to the left. Again the crank 21 is rotated a number of times corresponding to the tens figure in the multiplier, etc., until the multiplication operation has been completed.

I claim:

1. In a calculating machine, an accumulator having a rotatable supporting shaft; a plurality of numeral wheels rotatably mounted on said shaft; means for rotating said shaft; a drag mechanism associated with each numeral wheel and operative to rotate the same with said shaft; for each wheel, an escapement mechanism including a single electromagnet for preventing and selectively allowing rotation of each such numeral wheel; and tens-carry means comprising: a circuit for each of certain of said electromagnets for supplying tens-carry pulses thereto, including, in each circuit a self-locking relay having a holding coil and a holding coil circuit and a normally open relay switch adapted to be closed by a wheel when in its carry position and to be held closed by such relay coil, and in series with such relay switch a control switch and one of said electromagnets, means operative after the closing of such relay switch by its wheel to close such control switch to effect a carry, and means to open such circuit of such holding coil to restore such relay switch to open position.

2. In a calculating machine, an accumulator, a supporting shaft for the said accumulator, a plurality of numeral wheels rotatably mounted on the said shaft, cyclic means for driving the said shaft, a clutch mechanism associated with each numeral wheel and operative with rotation of said shaft, an ordinally arranged escapement mechanism, control means for said escapement mechanism including an electromagnet in each order for causing selective clutching and de-clutching of said numeral wheel to said shaft, and mechanism for supplying counting pulses to said electromagnets comprising a series of ordinally-spaced pickup coils, a plural order record-receiving means mounted for rotation with respect to said coils, means for ordinally shifting said record-receiving means, means for recording a figure in said magnetic record-receiving means by magnetizing said record-receiving means so that for each digit of the figure there are a corresponding number of magnetized points in the ordinally corresponding portion of the record-receiving means, and means for rotating said record-receiving means so that in each order thereof containing a magnetically-recorded number a corresponding number of pulses of current will be induced in the ordinally-related pickup coil and transmitted to the electromagnet which controls the escapement mechanism in that order.

3. In a calculating machine, an accumulator, a supporting shaft for the said accumulator, a plurality of numeral wheels rotatably mounted on the said shaft, a magnetic clutch for each numeral wheel adapted to be driven by the said shaft to effect registration in the said accumulator, each such clutch including a permanently magnetized driving element mounted for rotation with the said shaft, a complementary clutch follower element adapted to be magnetically driven thereby, the said follower element being mounted on its corresponding numeral wheel for rotation therewith, and an ordinally arranged escapement mechanism including an electromagnet in each order for controlling step-by-step driving engagement of each such permanently magnetized element with its complementary clutch follower element, and mechanism for supplying counting pulses to the said electromagnets comprising, a series of ordinally-spaced pickup coils, a plural order magnetic record-receiving means mounted for rotation with respect to said coils, means for ordinally shifting said record-receiving means, means for recording a figure in said record-receiving means by magnetizing said record-receiving means so that for each digit of the figure there is a corresponding portion of the record-receiving means, and means for rotating said record-receiving means so that in each order thereof containing a magnetically-recorded number a corresponding number of pulses of current will be induced in the ordinally related pickup coil and transmitted to the electromagnet which controls the escapement mechanism in that order.

4. In a calculating machine, an accumulator having a rotatable supporting shaft, a plurality of ordinally arranged numeral wheels rotatably mounted on said shaft, means for rotating said shaft, a magnetic drag mechanism associated with each numeral wheel and operative to rotate the same with the said shaft, an escapement mechanism associated with each said wheel and including an electromagnet for preventing and selectively allowing rotation of each such numeral wheel with said shaft, digitation pulse-generating means for supplying counting pulses to each such electromagnet, circuit means in and between two said electromagnets, one of said two being a higher order and the other a lower order electromagnet for supplying tens-carry pulses to the higher order electromagnet including a pair of normally-open switches connected in series, mechanism for closing one switch of the said pair whenever the numeral wheel in the lower order passes through its "9" to "0" position, and means synchronized with said shaft to thereafter close the other switch of the said pair and thereby energize the electromagnet in the higher order to effect a carry.

5. The combination set forth in claim 1 in which there are a plurality of such tens-carry means and in which the means operative after the closing of each such relay switch by its wheel to close the plurality of control switches that will be present in such plurality of tens-carry means, will operate to close such control switches seriatim from the lower orders to the higher orders of such accumulator, and said means to open such circuit of such holding coil, will open the circuits of all the holding coils in such plurality of tens-carry means after the completion of all carrys.

6. In a calculating machine, an accumulator having a plurality of wheels rotatably mounted, an electromagnet responsive to electric pulses for controlling the rotation of each wheel, means supplying each electromagnet with digitation pulses, and tens-carry means, comprising: a circuit for each of certain of said electromagnets for supplying tens-carry pulses thereto, including, in each circuit a self-locking relay having a holding coil and a holding coil circuit and a normally open relay switch adapted to be closed by a wheel when in its carry position and to be held closed by such relay coil, and in series with such relay switch a control switch and one of said electromagnets, means operative after the closing of such relay switch by its wheel to close such control switch to effect a carry, and means to open such circuit of such holding coil to restore such relay switch to open position.

7. In a calculating machine, ordinally arranged wheels, an escapement for each wheel to control the indexing thereof, a separate electromagnet operating each said escapement, digitation pulse generating means for supplying counting pulses to each such electromagnet, circuit means for supplying a single carry pulse to each electromagnet including a pair of normally open switches connected in series, mechanism for closing one switch of the said pair whenever a wheel passes through its carry position, and means to close the other switch in each such pair in sequence from lower to higher orders of said other switches.

8. In a calculating machine, ordinally arranged wheels, an escapement for each wheel to control the indexing thereof, a separate electromagnet operating each said escapement, digitation pulse generating means for supplying counting pulses to each such electrognet, circuit means for supplying a single carry pulse to the higher order electromagnet of an adjacent pair of said electromagnets including in each lower order, pulse storage means responsive to store a pulse whenever the numeral wheel in that order passes through its carry position, and means operating in sequence from lower to higher orders to, under the direction of said pulse storage means, transmit a pulse to said higher order electromagnet.

9. In a calculating machine, a register comprising a row of numeral wheels, a magnetic drag for and which tends to and may rotate each of said numeral wheels, an escapement for selectively controlling the rotation of each of said wheels, a plurality of ordinally arranged magnets for respectively actuating said escapement, means to supply current to said magnets including a plurality of pickup coils each provided with an electronic amplifier, a magnetic record-receiving member adapted to receive a plurality of ordinally and digitally arranged magnetic points, means for moving said member to variably determine ordinal correlation between said magnetic record-receiving member and said coils, and means for moving said member relative to said coils to bring the digitally arranged magnetic points for the instant ordinal position past said pickup coils to generate in said pickup coils pulses of current supply for said magnets.

10. In a calculating machine, an accumulator having a rotatable supporting shaft, a plurality of numeral wheels rotatably mounted on said shaft, means for driving said shaft, a drag mechanism associated with each such numeral wheel and said shaft, which mechanism tends to and may rotate such wheel upon rotation of said shaft, and escapement for such wheel, and control means for each such escapement including an electromagnet for actuating such escapement and thereby allowing rotation of such numeral wheel with said shaft; and mechanism for supplying counting pulses to each such electromagnet, comprising: a pickup coil associated with each such electromagnet, such escapement, and such wheel for controlling actuation of such electromagnet, escapement, and wheel, said pickup coils being ordinally arranged to have positional value, a record-receiving member adapted to receive magnetic points which are ordinally and digitally arranged thereon for inducing currents in said coils, means for recording a figure in said member by magnetizing such member, so that for each digit of the figure there is a corresponding magnetized point in such member which is so placed as to have digital value in a column, and means for moving said member relative to said means for recording so that a plurality of columns of digital values may be ordinally arranged in such manner to have positional value corresponding to the arrangement of said coils, to align columns so arranged with said coils so that from time to time various columns of said member may be aligned with various ones of said coils, and to pass along each column such coil as may be aligned therewith to induce current in such coil and such electromagnet to actuate such escapement to allow rotation of such wheel a distance corresponding to the digital value of the number recorded in such aligned column.

11. In a calculating machine, an accumulator having a rotatable supporting shaft, a plurality of numeral wheels rotatably mounted on said shaft, means for driving said shaft, a drag mechanism associated with each such numeral wheel and said shaft, which mechanism tends to and may rotate such wheel upon rotation of said shaft, an escapement for such wheel, and control means for each such escapement including an electromagnet for actuating such escapement and thereby allowing rotation of such numeral wheel with said shaft; and mechanism for supplying counting pulses to each such electromagnet, comprising: a pickup coil associated with each such electromagnet, such escapement, and such wheel for controlling actuation of such electromagnet, escapement, and wheel, said pickup coils being ordinally arranged to have positional value, a record-receiving member adapted to receive magnetic points which are ordinally and digitally arranged thereon for inducing currents in said coils, means for recording a figure in said member by magnetizing such member, so that for each digit of the figure there are a corresponding number of magnetized points in such member which are so placed as to have digital value in a column, and means for moving said member relative to said means for recording so that a plurality of columns of digital values may be ordinally arranged in such member to have positional value corresponding to the arrangement of said coils, to align columns so arranged with said coils so that from time to time various columns of said member may be aligned with various ones of said coils, and to pass along each column such coil as may be aligned therewith to induce a series of pulses corresponding to the points in such column in such coil and such electromagnet to actuate said escapement to allow rotation of such wheel a distance corresponding to the digital value of the number recorded in such aligned column.

References Cited in the file of this patent

UNITED STATES PATENTS

| 446,488 | Waring | Feb. 17, 1891 |
| 1,295,167 | Hollerith | Feb. 25, 1919 |
| 1,477,490 | Hough | Dec. 11, 1923 |
| 1,544,860 | Reisbach | July 7, 1925 |
| 1,982,722 | Zimmer | Dec. 4, 1934 |
| 2,150,227 | Lake et al. | Marf. 14, 1939 |
| 2,302,001 | Bryce | Nov. 17, 1942 |
| 2,544,610 | Nelson | Mar. 6, 1951 |
| 2,642,740 | Stephenson et al. | June 23, 1953 |

FOREIGN PATENTS

| 244,013 | Germany | June 3, 1909 |